(12) United States Patent
Guemmer

(10) Patent No.: US 7,011,495 B2
(45) Date of Patent: Mar. 14, 2006

(54) FLUID FLOW MACHINE (TURBOMACHINE) WITH INCREASED ROTOR-STATOR RATIO

(75) Inventor: Volker Guemmer, Mahlow (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 380 days.

(21) Appl. No.: 10/621,396

(22) Filed: Jul. 18, 2003

(65) Prior Publication Data
US 2004/0013520 A1   Jan. 22, 2004

(30) Foreign Application Priority Data
Jul. 20, 2002 (DE) .............................. 102 33 033

(51) Int. Cl.
*F01D 5/06* (2006.01)

(52) U.S. Cl. .................. 415/199.5; 415/220

(58) Field of Classification Search ............ 415/199.5, 415/220

See application file for complete search history.

(56) References Cited

U.S. PATENT DOCUMENTS

| | | | |
|---|---|---|---|
| 2,726,806 A | * | 12/1955 | Keast .................. 415/194 |
| 2,846,137 A | | 8/1958 | Smith, Jr. |
| 2,974,858 A | | 3/1961 | Koffel et al. |
| 2,991,929 A | | 7/1961 | Stalker |
| 4,460,309 A | * | 7/1984 | Walsh .................. 415/1 |
| 6,017,186 A | | 1/2000 | Hoeger et al. |
| 6,312,221 B1 | | 11/2001 | Yetka et al. |

FOREIGN PATENT DOCUMENTS

| | | |
|---|---|---|
| DE | 69423789 | 5/1997 |
| DE | 19650656 | 6/1998 |
| WO | 9600841 | 1/1996 |

* cited by examiner

*Primary Examiner*—Ninh H. Nguyen
(74) *Attorney, Agent, or Firm*—Harbin King & Klima

(57) ABSTRACT

A fluid-flow machine (turbomachine) includes at least one rotor equipped with blades and at least one stator equipped with vanes, the rotor being supported in a casing by means of a rotating shaft. A form of annulus is provided whose cross-sectional area in a stage consisting of at least one rotor and one stator results in a rotor-stator contraction ratio QRS which satisfies the equation:

$$[0.2+(KT-0.45)^{0.1}] < QRS < 3.0,$$

where KT is the total-stage contraction.

24 Claims, 4 Drawing Sheets

Section of a multi-stage turbomachine, definition of annulus areas

FLUID FLOW MACHINE (TURBOMACHINE) WITH INCREASED ROTOR-STATOR RATIO

This application claims priority to German Patent application no. DE10233033.6 filed Jul. 20, 2002, which application is incorporated by reference herein.

BACKGROUND OF THE INVENTION

This invention relates to a fluid-flow machine (turbomachine). More specifically, this invention relates to a fluid-flow machine (turbomachine) with at least one rotor equipped with blades and with at least one stator equipped with vanes, with the rotor being supported in a casing by means of a rotating shaft.

The aerodynamic loading of fluid-flow machines (turbomachines), such as fans, compressors, pumps and blowers, which can be operated with gaseous and liquid media, is determined by the growth and the separation of boundary layers both on the blades and on the hub as well as the casing walls. Normally, good operating characteristics are obtained if the aerodynamic load is distributed uniformly on the rotor blades and the stator vanes, for example in a fan or compressor stage. The annulus contraction of the rotor and the stator, i.e. the decrease of the cross-sectional area of the annulus in the direction of flow necessary for a compressive working media between the entry and exit plane of a stage, is here very similar. Minor differences in the contraction of the rotor and the stator result from the degree of reaction selected for the respective stage.

In designs according to the state of the art, the inner and outer annulus contours, for example of fans and compressors, converge continuously showing tapering without unevenness.

Accordingly, the annuli known from the state of the art fall into two categories, the first one being annuli which show a continuous taper and the second one being annuli which show a taper, but have a constant area in the axial gaps between the blades/vanes, with no contraction being present. The latter state of the art becomes apparent from U.S. Pat. No. 6,312,221 B1, for example.

BRIEF SUMMARY OF THE INVENTION

In a broad aspect, the present invention provides a fluid-flow machine (turbomachine) of the type specified at the beginning which, while being simply designed and dependable in operation, will aerodynamically unload the rotor.

It is a particular object of the present invention to provide a solution to the above problem by the features described herein, with further objects and advantages of the present invention becoming apparent from the description below.

The present invention accordingly provides a form of annulus whose cross-sectional area in at least one stage consisting of one rotor and one stator results in a rotor-stator contraction ratio QRS which satisfies the following equation:

$$[0.2+(KT-0.45)^{0.1}]<QRS<3.0$$

where KT is the total-stage contraction. QRS and KT are calculated as follows:

$QRS=KR/KS$ with $KR=ARI/ARA$ and $KS=ASI/ASA$ $KT=ARI/ASA$ where ARI, ARA, ASI and ASA are calculated as follows:

$$ARI=\pi(R_2^2-R_1^2)$$

$$ARA=\pi(R_4^2-R_3^2)$$

$$ASI=\pi(R_6^2-R_5^2)$$

$$ASA=\pi(R_8^2-R_7^2)$$

where in the direction of flow of the fluid-flow machine
$R_1$ is the radius at the base point of the rotor blade leading edge on the rotor shaft,
$R_2$ is the radius at the radial outer point of the rotor blade leading edge,
$R_3$ is the radius at the base point of the rotor blade trailing edge on the rotor shaft,
$R_4$ is the radius at the radial outer point of the rotor blade trailing edge,
$R_5$ is the radius at the radial inner point of the stator vane leading edge,
$R_6$ is the radius at the radial outer point of the stator vane leading edge,
$R_7$ is the radius at the radial inner point of the stator vane trailing edge, and
$R_8$ is the radius at the radial outer point of the stator vane trailing edge.

In an alternative form, the present invention provides a form of annulus whose cross-sectional areas result in axial-gap contractions KX1 and KX2 which satisfy the following equations:

$$0.8<KX1<1.0$$

$$0.8<KX2<1.0$$

where KX1 and KX2 satisfy the following equations:

$KX1=ARA/ASI$ $KX2=ASA/ARI2$ where ARA, ASI, ASA and ARI2 are calculated as follows:

$$ARA=\pi(R_4^2-R_3^2)$$

$$ASI=\pi(R_6^2-R_5^2)$$

$$ASA=\pi(R_8^2-R_7^2)$$

$$ARI2=\pi(R_{10}^2-R_9^2)$$

where, in the direction of flow of the fluid-flow machine (turbomachine),
$R_3$ is the radius at the base point of the rotor blade trailing edge on the rotor shaft,
$R_4$ is the radius at the radial outer point of the rotor blade trailing edge,
$R_5$ is the radius at the radial inner point of the stator vane leading edge,
$R_6$ is the radius at the radial outer point of the stator vane leading edge,
$R_7$ is the radius at the radial inner point of the stator vane trailing edge,
$R_8$ is the radius at the radial outer point of the stator vane trailing edge,
$R_9$ is the radius at the radial inner point of the leading edge of the downstream next rotor blade, and
$R_{10}$ is the radius at the radial outer point of the leading edge of the downstream next rotor blade.

The present invention is characterized by a variety of merits.

The invention relates to a fluid-flow machine (turbomachine) of axial and semi-axial design for both gaseous and liquid working media.

The solution according to the present invention is useful for fluid-flow machines (turbomachines) with only one stage (rotor and stator) and with multiple stages.

As already known from the state of the art, the rotor comprises a number of blades which are fitted to the rotating shaft of the fluid-flow machine and transfer energy to the working medium. Accordingly, the stator consists of a number of stationary vanes which are either shrouded on both ends or have a free end at the side of the hub. Both, rotor and stator, are situated in a casing.

Furthermore, the fluid-flow machine in the form according to the present invention can be provided with a stator (inlet guide vanes) in front of the first rotor. The vanes of the stators can be rotatable, enabling them to be adjusted from outside of the casing, for example by means of a jackscrew-type actuator.

In the case of the first solution according to the present invention which relates to the contraction ratio QRS between the rotor and the stator, it is particularly favourable if the fluid-flow machine, which, for example, can be a turbomachine, comprises stators with special high-lift configuration and correspondingly high aerodynamic loadability. Under this aspect, it is highly advantageous to provide the individual stages of this fluid-flow machine (turbomachine) with a form of annulus whose cross-sectional area, while holding the rotor loading constant, enables the stator loading to be increased significantly. Different from the state of the art, it is in this case useful to provide a notable excess of the rotor-stator contraction ratio of a stage. Considering a stage of a multi-stage fluid-flow machine (turbomachine), the contraction at the rotor in the stage is relatively high, while the contraction at the stator in the same stage is much lower. This situation can be quantified by the contraction ratio QRS between rotor and stator according to the present invention.

DETAILED DESCRIPTION OF THE INVENTION

This detailed description should be read in conjunction with the brief summary of the invention above.

Figure 1:
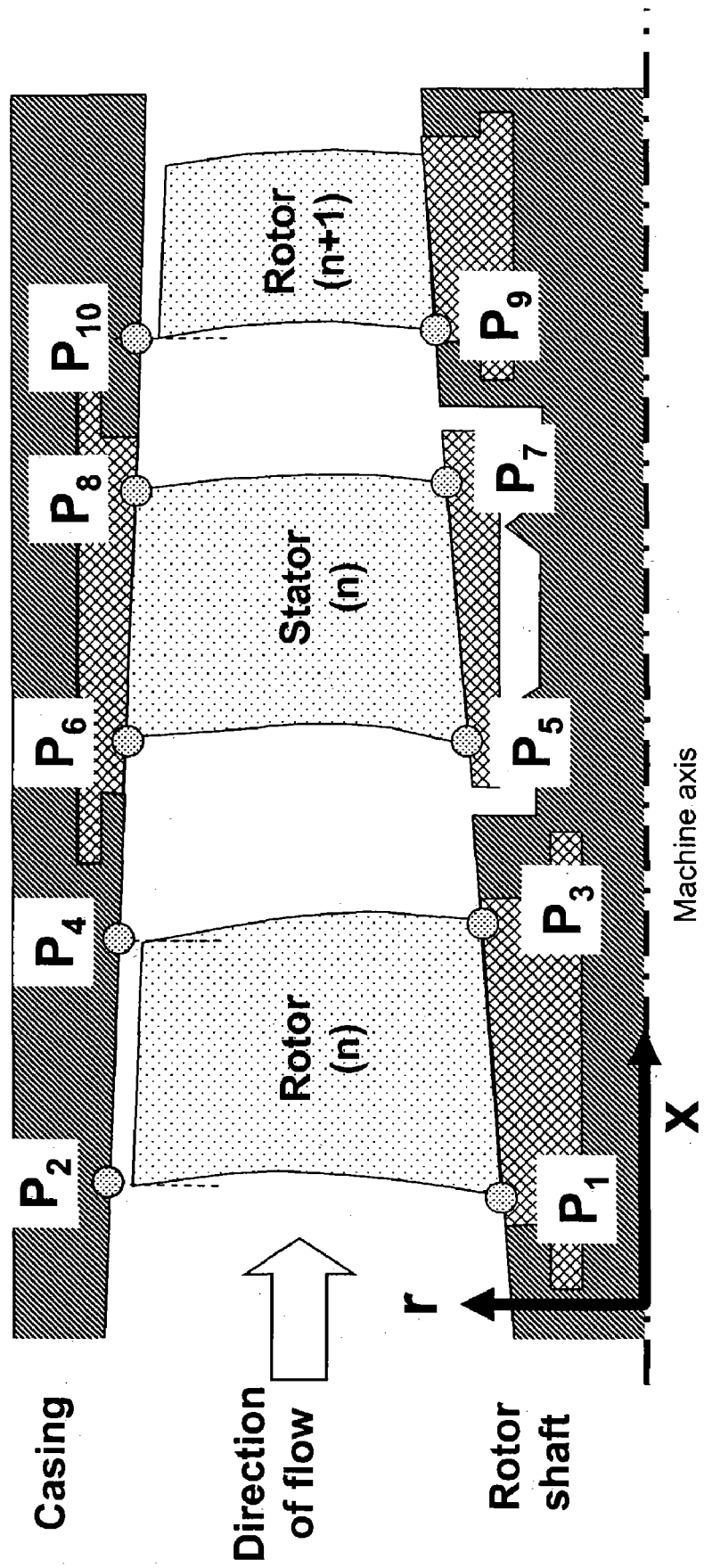
FIG. 1 shows a section of a multi-stage turbomachine with a definition of the cross-sectional areas of the annulus.

FIG. 1 shows the n-th stage of a multi-stage turbomachine. The four corner points of the rotor (n) and of the stator (n) as well as the forward corner points of the subsequent rotor (n+1) are specially marked. The corner points are defined by the sections of the leading and trailing edges (or their radial extensions in the case of rotor blade or stator vane ends with an annular gap) with the casing or the hub, respectively. If the hub or casing contour in the circumferential direction does not extend with a constant radius, the arithmetically averaged radius in the circumferential direction will apply. The rotor (n) has the points P1 to P4, the stator (n) has the points P5 to P8, and the rotor (n+1) has the points P9 to P10. Each point P(i) has the axial position X(i) and the Radius R(i). The coordinate reference system lies on the machine axis.

Figure 2:
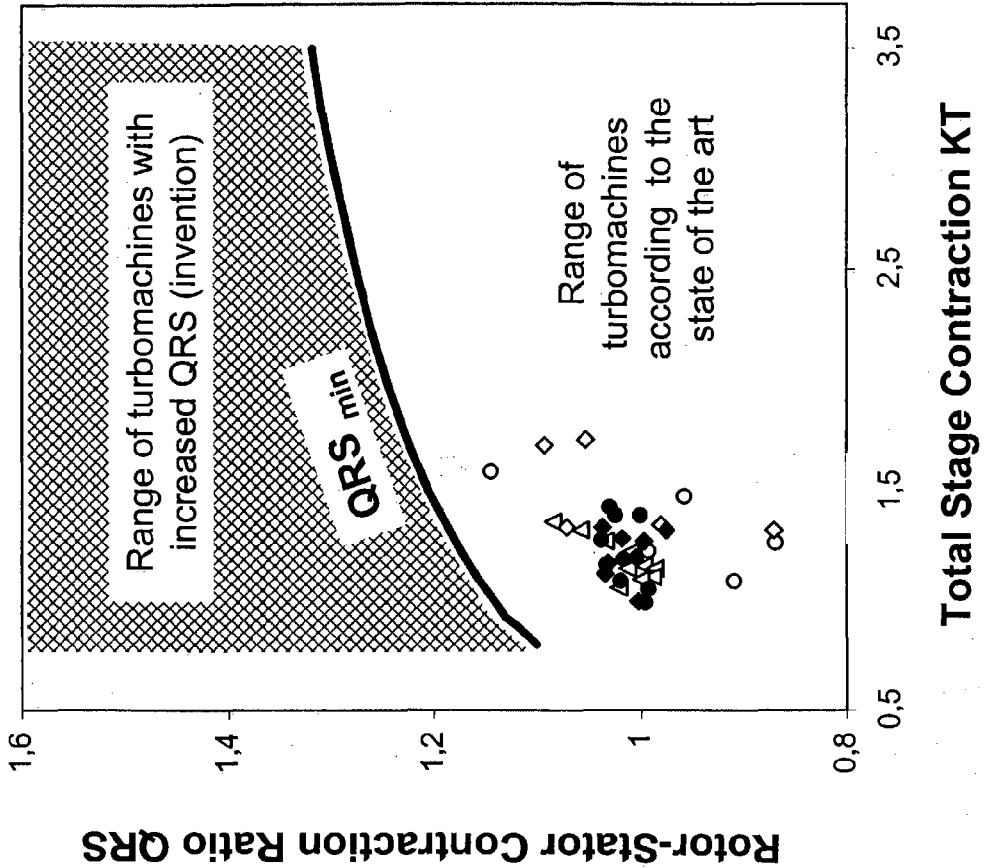
FIG. 2 shows the formulas for the calculation of the five cross-sectional areas of the annulus.

FIG. 2 shows the formulas for the calculation of the five cross-sectional areas of the annulus ARI, ARA, ASI, ASA and ARI2 that can be calculated from the radii. Accordingly, the rotor contraction is obtained from KR=ARI/ARA, while the stator contraction is calculated from KS=ASI/ASA.

The contraction ratio between rotor and stator thus is QRS=KR/KS.

Furthermore, the total-stage contraction KT=ARI/ASA is important.

The present invention relates to a range of increased values of QRS in dependence of KT according to the following rule:

$$[0.2+(KT-0.45)^{0.1}]<QRS<3.0$$

The relationship according to the above formula is shown in graphical form on the right-hand side of FIG. 2. As is apparent, the fluid-flow machines (turbomachines) according to the state of the art lie clearly below the characteristic.

Figure 3:
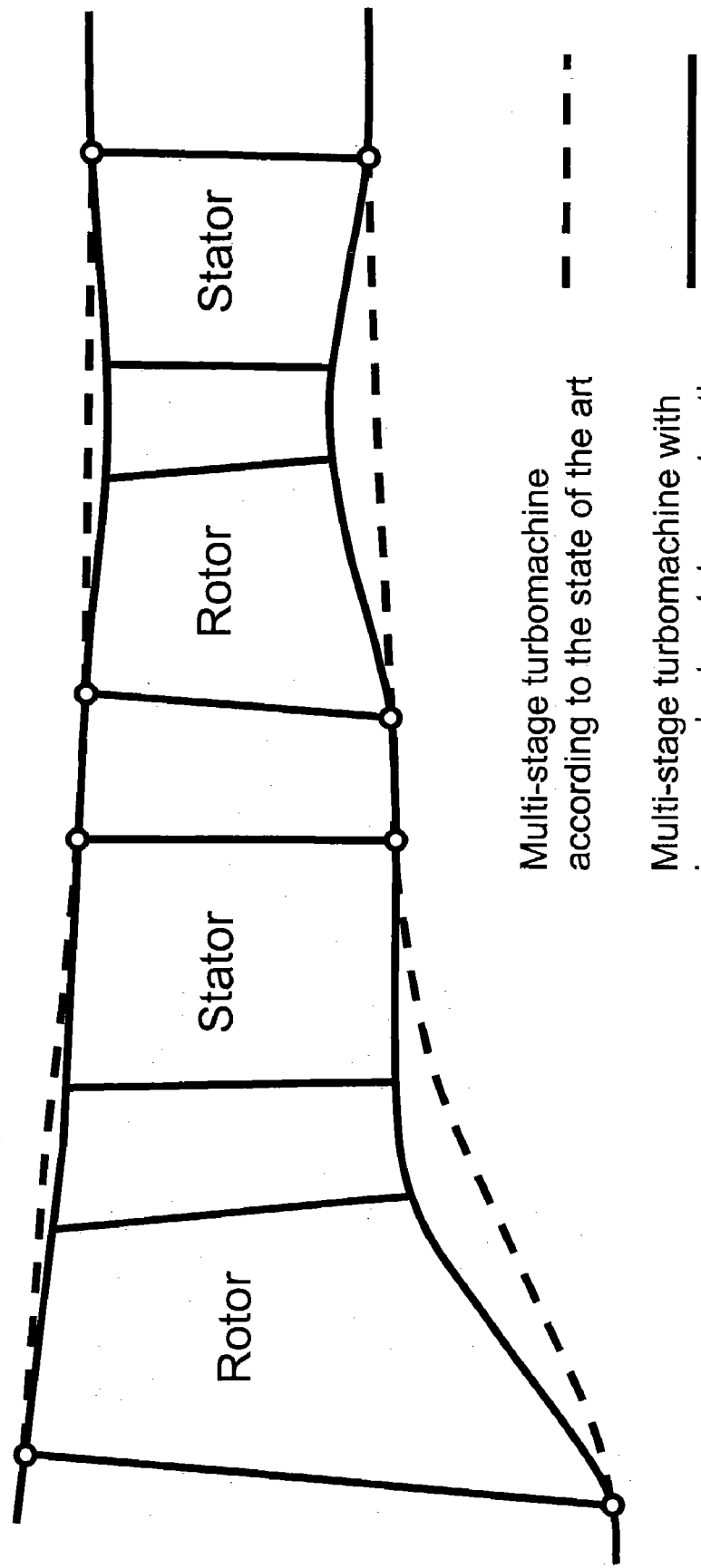
FIG. 3 shows an example of a form of annulus according to the present invention in comparison with an annulus according to the state of the art.

FIG. 3 shows an example of a form of annulus according to the present invention in comparison with an annulus according to the state of the art. Using this annulus configuration according to the state of the art as the basis, the QRS criterion can be satisfied by solely the shape of the hub contour of the rotor shaft, by solely the shape of the casing contour, or by a combination of shapes of the hub and the casing contours, respectively.

Obviously, a highly simplified form of representation has been selected in FIG. 3. It would also be possible to change the rotor entry and exit points.

The above alternative of the solution in accordance with the present invention takes into account the extension of the static pressure build-up, which is normally confined to the rotor and stator rows, to the axial gaps between the individual blade/vane rows. This situation can also be described in quantitative terms using the cross-sectional areas of the annulus at the entry and exit planes of the rotors and stators. For this purpose, reference is again made to FIG. 1.

As shown in FIG. 2, the given cross-sectional areas of the annulus ARA, ASI, ASA and ARI2 permit the calculation of the contraction KX1=ARA/ASI between rotor and stator and of the contraction KX2=ASA/ARI2 between stator and subsequent rotor. Accordingly, the invention provides for a range of values of KX below 1.0. Here, the following rules apply:

0.8<KX1<1.0 and 0.8<KX2<1.0.

The values known from the state of art always exceed 1.0 or amount to 1.0, respectively.

Figure 4:
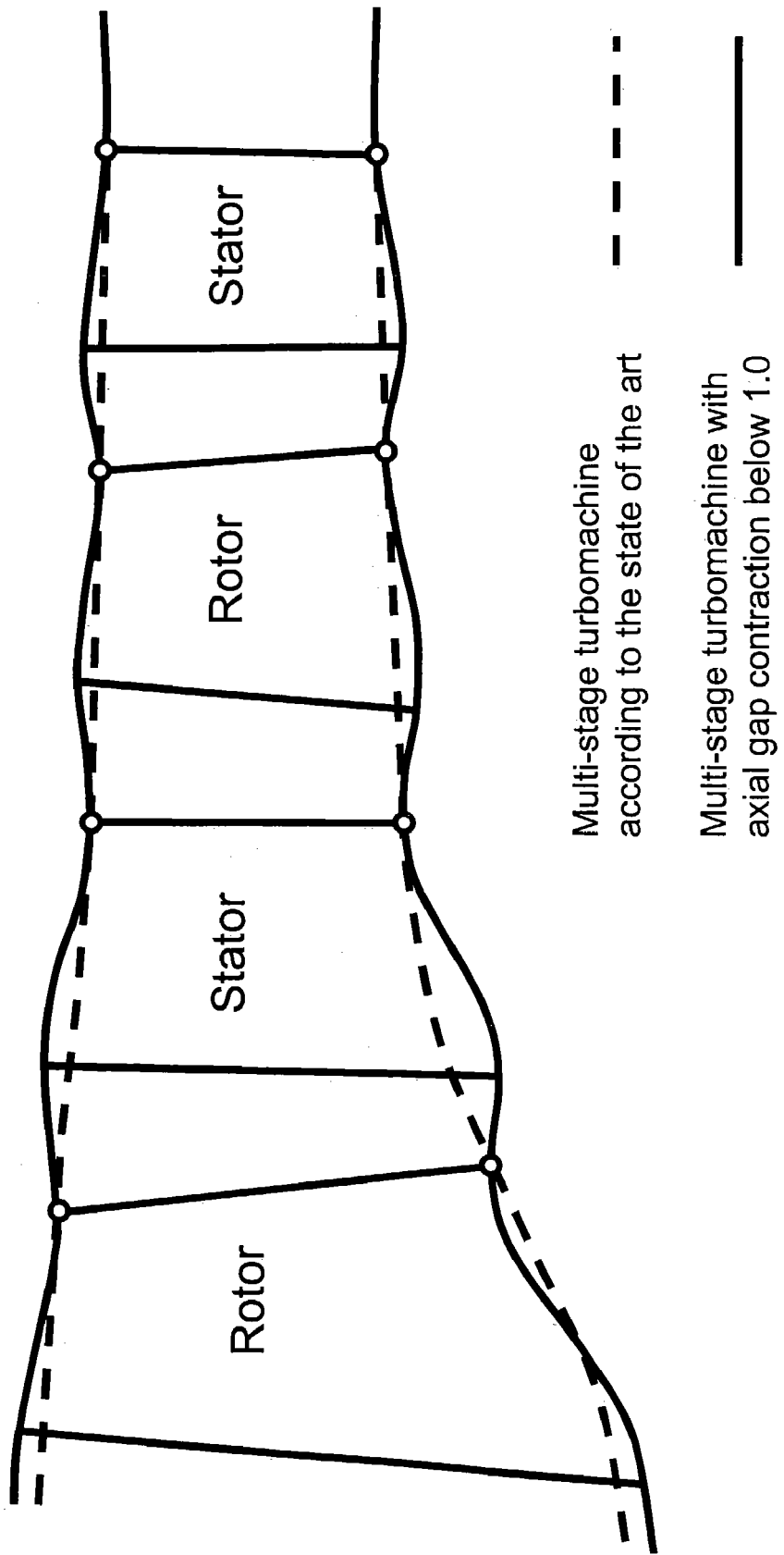
FIG. 4 shows an example of an annulus form according to the present invention in comparison with an annulus according to the state of the art.

FIG. 4 shows an example of an annulus form according to the present invention in comparison with an annulus according to the state of the art. Using a given annulus configuration (state of the art) as the basis, the KX criterion according to the present invention can be satisfied by solely the shape of the hub contour, by solely the shape of the casing contour, or by a combination of the shapes of the hub and the casing contours, respectively.

For reasons of clarity, the possibility to change rotor and stator exit points was also dispensed with in FIG. 4.

The comparison with the state of the art reveals that the annuli known from the state of the art do not include the use of highly different contractions (area ratios) in rotor and stator. Accordingly, the solution according to the present invention is highly advantageous if different design methodologies are applied for rotors and stators. These may comprise the use of traditional techniques at the rotor and the application of high-lift configurations at the stator. All fan and compressor designs according to the state of art show well-defined differences in the percentage decrease of the annulus areas in the direction of flow across the rotor and the stator of one stage. Also, the state of the art does not take account of any partial relocation of diffusion from the blade/vane rows to the axial gap. This means that a decreasing or constant cross-sectional area of the annulus in the direction of flow is assumed in the state of the art.

Therefore, it is a particular advantage of the present invention that the use of an increased rotor-stator contraction ratio creates the prerequisites for the design of a fluid-flow machine, or a turbomachine, which includes the hybrid application of a conventionally developing rotor technology and a novel technology for stators in high-lift configurations. The approach according to the present invention is, therefore, completely novel and different from the state from the art, creating a distinguished category of new fluid-flow machines or turbomachines.

For a given pressure ratio of a turbomachine, the number of components installed can be reduced by approx. 40 percent, with efficiency being constant or improved (by up to 2 percent depending on the operation of the special stators mentioned) The resultant cost saving is approx. 20 percent.

If this concept is used in the compressor of an aircraft engine with approx. 25,000 lbs thrust, specific fuel consumption will be reduced by up to 1 percent.

Furthermore, the application of axial-gap contractions below 1.0 presents an opportunity to include the axial gaps, which normally are unused, as active elements in the static pressure build-up process within a fluid-flow machine (turbomachine), thus utilizing more effectively a given axial build length. This approach is also completely novel with regard to its overall concept and is fully left out of consideration in the state of the art. This approach in itself creates a distinguished category of novel fluid-flow machines (turbomachines). For a given pressure ratio of the fluid-flow machine (turbomachine), efficiency can be increased by approx. 0.5 percent and the number of blades/vanes installed reduced by 5 percent. The resultant cost saving amounts to approx. 2 percent. If the concept is used in the compressor of an aircraft engine with approx. 25,000 lbs. thrust, specific fuel consumption is reduced by approx. 0.25 percent.

What is claimed is:

1. A fluid-flow machine comprising:
   at least one rotor equipped with blades;
   at least one stator equipped with vanes; the rotor being supported in a casing by a rotating shaft;
   wherein, a form of annulus is provided whose cross-sectional area in a stage consisting of at least one rotor and one stator results in a rotor-stator contraction ratio QRS which satisfies the equation:

$$[0.2+(KT-0.45)^{0.1}]<QRS<3.0,$$

where QRS is defined by the formula $$QRS=KR/KS,$$

where KT is a total-stage contraction; QRS and KT being calculated as follows:

$$QRS=KR/KS \text{ with } KR=ARI/ARA$$

$$\text{and } KS=ASI/ASA$$

$$\text{and } KT=ARI/ASA$$

where ARI, ARA, ASI and ASA are calculated as follows:

$$ARI=\pi(R_2^2-R_1^2)$$

$$ARA=\pi(R_4^2-R_3^2)$$

$$ASI=\pi(R_6^2-R_5^2)$$

$$ASA=\pi(R_8^2-R_7^2)$$

where, in a direction of flow of the fluid-flow machine:
   $R_1$ is a radius at a base point of a rotor blade leading edge on the rotor shaft,
   $R_2$ is a radius at a radial outer point of the rotor blade leading edge,
   $R_3$ is a radius at a base point of a rotor blade trailing edge on the rotor shaft,
   $R_4$ is a radius at a radial outer point of the rotor blade trailing edge,
   $R_5$ is a radius at a radial inner point of a stator vane leading edge,
   $R_6$ is a radius at a radial outer point of the stator vane leading edge,
   $R_7$ is a radius at a radial inner point of a stator vane trailing edge, and
   $R_8$ is a radius at a radial outer point of the stator vane trailing edge.

2. A fluid-flow machine in accordance with claim 1, wherein the value of QRS is obtained by shaping a contour of at least one of a hub and the rotor shaft, respectively.

3. A fluid-flow machine in accordance with claim 2, and further comprising the casing, wherein the value of QRS is also at least partially obtained by shaping a contour of the casing.

4. A fluid-flow machine in accordance with claim 3, having a single stage comprising a rotor and a stator.

5. A fluid-flow machine in accordance with claim 3, having multiple stages, each comprising a rotor and a stator.

6. A fluid-flow machine in accordance with claim 1, and further comprising the casing, wherein the value of QRS is at least partially obtained by shaping a contour of the casing.

7. A fluid-flow machine in accordance with claim 1, having a single stage comprising a rotor and a stator.

8. A fluid-flow machine in accordance with claim 1, having multiple stages, each comprising a rotor and a stator.

9. A fluid-flow machine in accordance with claim 1, wherein a second form of annulus is provided whose cross-sectional areas result in axial-gap contractions KX1 and KX2 which satisfy the following equations:

$$0.8<KX1<1.0$$

$$0.8<KX2<1.0,$$

where KX1 and KX2 satisfy the following equations:

$$KX1=ARA/ASI$$

$$KX2=ASA/ARI2,$$

where ARI2 is calculated as follows:

$$ARI2=\pi(R_{10}^2-R_9^2)$$

where, in the direction of flow of the fluid-flow machine:
   $R_9$ is a radius at a radial inner point of a leading edge of a downstream next rotor blade, and $R_{10}$ is a radius at a radial outer point of the leading edge of the downstream next rotor blade.

10. A fluid-flow machine in accordance with claim 9, wherein the values of at least one of QRS, KX1 and KX2, respectively, are obtained by shaping a contour of at least one of a hub and the rotor shaft, respectively.

11. A fluid-flow machine in accordance with claim 10, and further comprising the casing, wherein the values of at least one of QRS, KX1 and KX2, respectively, are also at least partially obtained by shaping a contour of the casing.

12. A fluid-flow machine in accordance with claim 11, having a single stage comprising a rotor and a stator.

13. A fluid-flow machine in accordance with claim 11, having multiple stages, each comprising a rotor and a stator.

14. A fluid-flow machine in accordance with claim 9, and further comprising the casing, wherein the values of at least one of QRS, KX1 and KX2, respectively, are at least partially obtained by shaping a contour of the casing.

15. A fluid-flow machine in accordance with claim 9, having a single stage comprising a rotor and a stator.

16. A fluid-flow machine in accordance with claim 9, having multiple stages, each comprising a rotor and a stator.

17. A fluid-flow machine comprising:
at least one rotor equipped with blades;
at least one stator equipped with vanes, the rotor being supported in a casing by a rotating shaft;
wherein a form of annulus is provided whose cross-sectional areas result in axial-gap contractions KX1 and KX2 which satisfy the following equations:

$$0.8 < KX1 < 1.0$$

$$0.8 < KX2 < 1.0,$$

where KX1 and KX2 satisfy the following equations:

$$KX1 = ARA/ASI$$

$$KX2 = ASA/ARI2,$$

where ARA, ASI, ASA and ARI2 are calculated as follows:

$$ARA = \pi(R_4^2 - R_3^2)$$

$$ASI = \pi(R_6^2 - R_5^2)$$

$$ASA = \pi(R_8^2 - R_7^2)$$

$$ARI2 = \pi(R_{10}^2 - R_9^2),$$

where, in a direction of flow of the fluid-flow machine:
$R_3$ is a radius at a base point of a rotor blade trailing edge on the rotor shaft,
$R_4$ is a radius at a radial outer point of the rotor blade trailing edge,
$R_5$ is a radius at a radial inner point of a stator vane leading edge,
$R_6$ is a radius at a radial outer point of the stator vane leading edge,
$R_7$ is a radius at a radial inner point of a stator vane trailing edge,
$R_8$ is a radius at a radial outer point of the stator vane trailing edge,
$R_9$ is a radius at a radial inner point of a leading edge of a downstream next rotor blade, and
$R_{10}$ is a radius at a radial outer point of the leading edge of the downstream next rotor blade.

18. A fluid-flow machine in accordance with claim 17, wherein the values of at least one of KX1 and KX2, respectively, are obtained by shaping a contour of at least one of a hub and the rotor shaft, respectively.

19. A fluid-flow machine in accordance with claim 18, and further comprising the casing, wherein the values of at least one of KX1 and KX2, respectively, are also at least partially obtained by shaping a contour of the casing.

20. A fluid-flow machine in accordance with claim 19, having a single stage comprising a rotor and a stator.

21. A fluid-flow machine in accordance with claim 19, having multiple stages, each comprising a rotor and a stator.

22. A fluid-flow machine in accordance with claim 17, and further comprising the casing, wherein the values of at least one of KX1 and KX2, respectively, are at least partially obtained by shaping a contour of the casing.

23. A fluid-flow machine in accordance with claim 17, having a single stage comprising a rotor and a stator.

24. A fluid-flow machine in accordance with claim 17, having multiple stages, each comprising a rotor and a stator.

* * * * *